United States Patent
Hamann et al.

(10) Patent No.: US 12,360,905 B2
(45) Date of Patent: Jul. 15, 2025

(54) COMPUTER-IMPLEMENTED METHOD FOR MANAGING CACHE UTILIZATION

(71) Applicant: Robert Bosch GmbH, Stuttgart (DE)

(72) Inventors: Arne Hamann, Ludwigsburg (DE); Dakshina Narahari Dasari, Boeblingen (DE); Falk Rehm, Renningen (DE); Michael Pressler, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 110 days.

(21) Appl. No.: 18/062,723

(22) Filed: Dec. 7, 2022

(65) Prior Publication Data
US 2023/0236981 A1  Jul. 27, 2023

(30) Foreign Application Priority Data
Jan. 24, 2022 (DE) ............ 10 2022 200 738.7

(51) Int. Cl.
*G06F 12/08* (2016.01)
*G06F 12/0811* (2016.01)
*G06F 12/0837* (2016.01)
*G06F 12/084* (2016.01)
*G06F 12/0882* (2016.01)

(52) U.S. Cl.
CPC ........ *G06F 12/084* (2013.01); *G06F 12/0811* (2013.01); *G06F 12/0837* (2013.01); *G06F 12/0882* (2013.01); *G06F 2212/1021* (2013.01)

(58) Field of Classification Search
CPC ............... G06F 12/084; G06F 12/0811; G06F 12/0837; G06F 12/0882; G06F 12/0871; G06F 12/0813; G06F 2212/1021
See application file for complete search history.

(56) References Cited

U.S. PATENT DOCUMENTS

| | | | |
|---|---|---|---|
| 7,062,631 B1* | 6/2006 | Klaiber ............... | G06F 12/0837 711/E12.036 |
| 7,856,530 B1* | 12/2010 | Mu ..................... | G06F 12/0888 711/119 |
| 10,216,630 B1* | 2/2019 | Shang ................. | G06F 12/0866 |
| 2013/0007755 A1* | 1/2013 | Chambliss ............. | G06F 3/067 718/103 |

(Continued)

*Primary Examiner* — Tracy C Chan
(74) *Attorney, Agent, or Firm* — NORTON ROSE FULBRIGHT US LLP (57) ABSTRACT

A computer-implemented method for managing cache utilization of at least a first processor when sharing a cache with a further processor. The method includes: executing, during a first regulation interval, a first application on a first processor, wherein the first application causes at least one block to be mapped from an external memory to a shared cache according to a cache utilization policy associated with the first application; monitoring a utilization of the shared cache by the first processor during the first regulation interval; comparing the utilization of the shared cache by the first processor to a cache utilization condition associated with the first processor; and adjusting the cache utilization policy associated with the first application, when the utilization of the shared cache by the first processor exceeds the cache utilization condition associated with the first processor.

16 Claims, 4 Drawing Sheets

(56) References Cited

U.S. PATENT DOCUMENTS

| | | | |
|---|---|---|---|
| 2014/0237185 A1* | 8/2014 | Solihin | G06F 12/1027 |
| | | | 711/119 |
| 2018/0322065 A1* | 11/2018 | Yaroshevich | G06F 9/3017 |
| 2019/0243762 A1* | 8/2019 | Birke | G06F 9/45533 |
| 2021/0089462 A1* | 3/2021 | Moyer | G06F 12/0888 |

* cited by examiner

COMPUTER-IMPLEMENTED METHOD FOR MANAGING CACHE UTILIZATION

CROSS REFERENCE

The present application claims the benefit under 35 U.S.C. § 119 of German Patent Application No. DE 10 2022 200 738.7 filed on Jan. 24, 2022, which is expressly incorporated herein by reference in its entirety.

FIELD

The present invention concerns a computer-implemented method for managing cache utilization of at least a first processor when sharing a cache with a further processor, and an associated data processing system, computer program element, and computer readable medium.

BACKGROUND INFORMATION

In an embedded computing system, the main memory is, typically, most remote from the processor, followed by the last level cache, and then followed by other cache levels. When a processor finds requested data in the cache, a cache hit occurs. When a processor does not find data that it has requested in the cache, a cache miss occurs. The data relating to the cache miss is loaded into the cache from main memory. Typically, the proportion of main memory loaded into the cache is referred to as a cache block, or alternatively as a cache line. Data is transferred to the cache in cache blocks. Owing to temporal and spatial locality of computer programs, it is likely that more references to the cache block will be required, and so the cache block loaded from main memory remains in the cache until it is overwritten.

Embedded processing systems implemented as a System on Chip frequently execute at least two applications having different levels of criticality, such as safety criticality. Approaches for the cache composition in an embedded processing system executing at least two applications having different levels of criticality may be further improved.

SUMMARY

According to a first aspect of the present invention, there is provided a computer-implemented method for managing cache utilization of at least a first processor when sharing a cache with a further processor. According to an example embodiment of the present invention, the method comprises:
  executing, during a first regulation interval, a first application on a first processor, wherein the first application causes at least one block to be mapped from an external memory to a shared cache according to a cache utilization policy associated with the first application;
  monitoring a utilization of the shared cache by the first processor during the first regulation interval;
  comparing the utilization of the shared cache by the first processor to a cache utilization condition associated with the first processor; and
  adjusting the cache utilization policy associated with the first application, if the utilization of the shared cache by the first processor exceeds the cache utilization condition associated with the first processor.

Advantageously, the method according to the present specification does not involve dedicating fixed cache regions to certain applications or processors. The cache can be used as a latency hiding mechanism which allows the storage of data closer to where the data is accessed. This enables better utilisation of the cache. Furthermore, the proposed approach does not involve modifications to the memory translation mechanism of the operating system (in contrast to cache colouring). Therefore, the present technique has a low run-time overhead, compared to cache colouring. Furthermore, cache management technique of the present specification can handle dynamic workloads as well. For example, the method is suited to a static mix of applications, but also can be applied to applications that are dynamically loaded or unloaded from the system. Cache contention is thereby reduced. By choosing an appropriate cache occupancy budget for each processor and an appropriate regulation interval, the amount of interference that each processor can introduce is controllable, implying that workloads can be managed according to a quality of service target. For example, the cache allocation policy is derived from the application requirements, but is decided by a central entity which decides how much cache space each application can occupy.

Therefore, the technique improves on methods such as static partitioning and cache colouring, because unused cache partitions (as may occur with static partitioning and cache colouring) lead to inefficient cache usage. Furthermore, cache colouring and static partitioning imply that applications must work with a dedicated but reduced cache. This leads to performance degradation of both applications. Finally, cache colouring and static partitioning are suited to fixed workloads deployed on a system and suffer performance degradation in the context of dynamically arriving workloads of different criticalities (importance).

According to a second aspect of the present invention, there is provided a data processing system. According to an example embodiment of the present invention, the data processing system comprises at least one processor, a shared cache communicably coupled to the at least one processor and a further processor, an external memory communicably coupled to the shared cache, and a control entity. The control entity is configured to schedule execution, during a first regulation interval, of a first application on the at least one processor, wherein the first application causes at least one block to be mapped from an external memory to a shared cache according to a cache utilization policy associated with the first application, to monitor a utilization of the shared cache by the at least one processor during the first regulation interval, to compare the utilization of the shared cache by at least one processor to a cache utilization condition associated with the at least one processor, and to adjust the utilization policy associated with the first application, if the utilization of the shared cache by the at least one processor exceeds the cache utilization condition associated with the at least one processor.

According to a third aspect of the present invention, there is provided a computer program element comprising machine-readable instructions which, when executed by a processor, cause the processor to perform the method of the first aspect.

According to a fourth aspect of the present invention, there is provided a computer readable medium comprising the computer program element of the third aspect.

BRIEF DESCRIPTION OF THE DRAWINGS

Exemplary embodiments of the present invention are depicted in the figures, which are not to be construed as limiting the present invention and are explained in greater detail below.

DETAILED DESCRIPTION OF EXAMPLE EMBODIMENTS

Emerging applications such as autonomous driving are compute and data intensive. There is therefore a trend towards using high performance computing platforms in such cyber-physical systems. Software applications operating in the context of autonomous driving have varying timing requirements which must share the same computing platform (such as a system on chip, SOC). The computing platform is generally characterized by multiple processors (cores) organised in a cluster. The processors share a last level cache, one or multiple shared interconnection networks (buses) from the processors to the memory, and a shared main memory.

An application executed by at least one processor can experience a significant increase in execution time when executed simultaneously with other applications on a common multi-processor platform due to problems that the processes experience when accessing shared resources, predominantly the shared cache. Virtual memory management causes data (such as instructions and operands) to be mapped to the same cache blocks. This causes a cache block of a first application to evict a cache block of the second application when the applications are executed simultaneously on different processors. This leads to additional delays, because the evicted cache block must be re-fetched from the main memory, thereby leading to performance degradation.

The technique of the present specification proposes to reduce the interference effect when different applications are co-executed on a multi-processor platform, especially for applications with real-time requirements. For example, an approach for cache utilisation management discussed in this specification may be applied to automotive platforms, industrial automation and control systems.

Accordingly, when the working set size of all concurrently running is greater than the cache size, a method to decide the allocation of cacheable pages to an application is required. In a regular operation, caches all pages of an application, without reference to the application priority and cache behaviour. In many cases, this may lead to suboptimal system performance. For example, single use pages, or unimportant pages are cached until they are evicted, thereby preventing more useful pages from other applications being cached. Furthermore, the mechanism of caching all pages, without reference to the priority of the application, may not be ideal in the scenario when some applications have more stringent timing requirements than others for correct functioning.

Existing solutions to provide temporal isolation, and to reduce cache contention, propose either the use of static last level cache partitioning in hardware, or use an operating system mechanism like cache colouring to provide a dedicated cache subset to certain applications to prevent interference between applications. In extreme cases entirely paused, or turned off, when a timing critical application is executing. Other existing approaches propose to restrict memory bandwidth by stalling processors.

Figure 1:
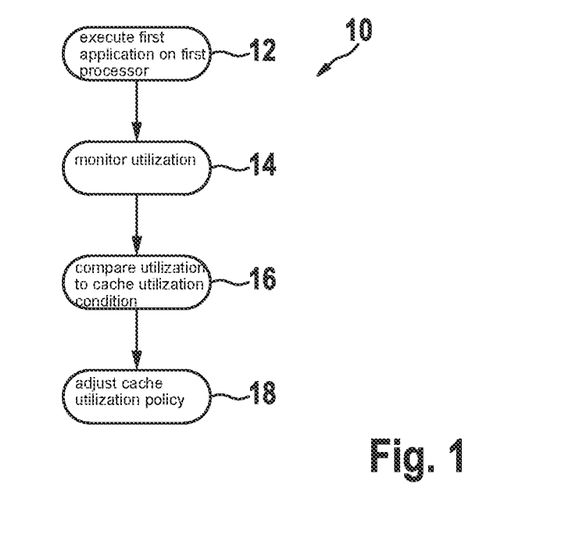
FIG. 1 schematically illustrates a method according to the first aspect of the present invention.

FIG. 1 schematically illustrates a method according to the first aspect.

The technique of this specification may, for example, be deployed either in an operating system or a hypervisor of an embedded system. A monitor determines when a system is undergoing degradation due to excessive shared cache usage. The burden on the cache is reduced by marking certain pages as uncacheable during a pre-configured interval referred to as the regulation interval. For a number of the processors, the technique provides an interface allowing the system designer to assign a last-level cache occupancy budget at a processor level, and to define a system-wide regulation interval. The cache occupancy budget corresponds to the maximum number of last-level cache block used by each of the processors in a given regulation interval. When the cache occupancy of a processor exceeds the threshold, the technique disables caching new incoming requests from that processor until the next regulation interval.

Figure 2:
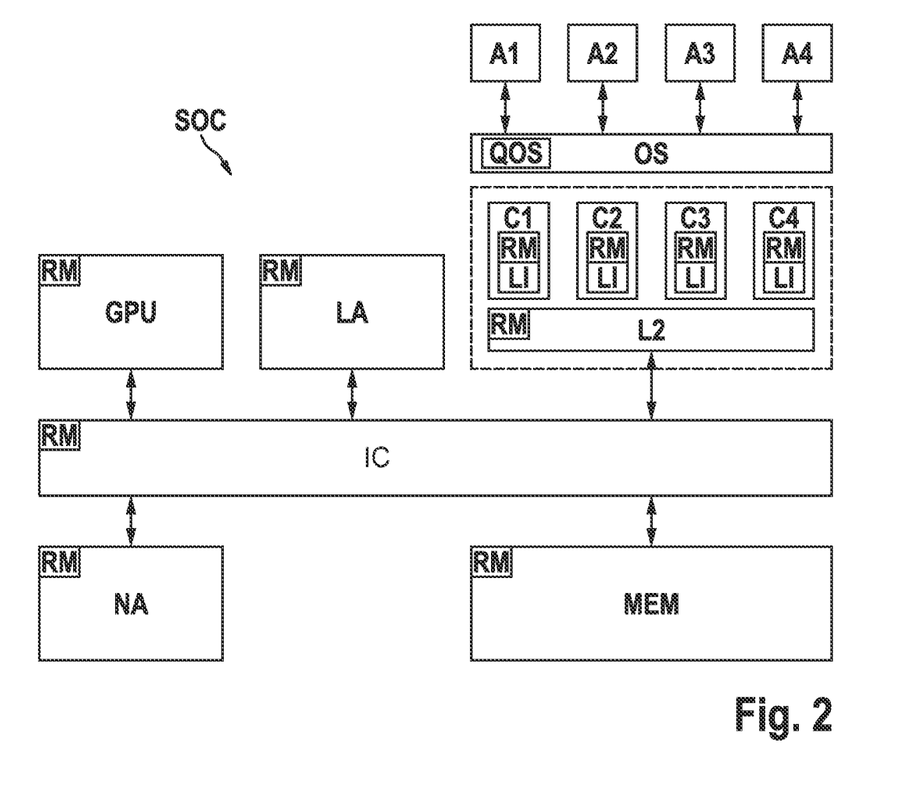
FIG. 2 schematically illustrates an example of a system on chip architecture, according to an example embodiment of the present invention.

FIG. 2 schematically illustrates an example of a system on chip architecture.

To contextualise the method, an exemplary data processing system is described. The system on chip SOC illustrated in FIG. 2 comprises a multicore processing unit comprising four processors (cores) C1-C4. The processor C1 comprises a cache L1 that may be addressed processor C1. The multicore processing unit further comprises a shared cache L2 that all processors C1-C4 of the multicore processing unit may access simultaneously. The cache L2 is, in an example, a coherent cache An operating system (or a hypervisor) hosts a plurality of mixed criticality applications A1-A4. For example, application A1 is a high-criticality image recognition algorithm as utilised in autonomous driving. Application A2 is a low criticality infotainment program. The operating system also hosts a quality of service QoS supervisor, for example, as a daemon process (not being directly accessible to a user).

An interconnect IC communicably couples the multicore processing unit elements. In an example, the interconnect is a bus. In an example, the interconnect is a cache-coherent mesh interconnect such as Corelink (TM) as provided by ARM (TM). As illustrated, the interconnect IC connects the multicore processing unit with at least a graphics processing unit GPU, a network adapter NA (such as a CANBUS (TM) adapter), at least one memory MEM, and at least one special-purpose processor CA. The special-purpose processor may, for example, be a machine learning accelerator. A skilled person will appreciate that many topologies can be provided based on the application scenario of interest.

A plurality of elements in the system on Chip SOC comprise a resource manager RM. In an example, the resource manager of the cache units L1 and L2 is configured to collect metrics monitoring the cache misses arising from each processor, monitoring the response time of critical applications, or the average response times of applications on certain cores. For example, the resource manager RM may supervise the utilization of the system-wide main memory MEM system.

Figure 3:
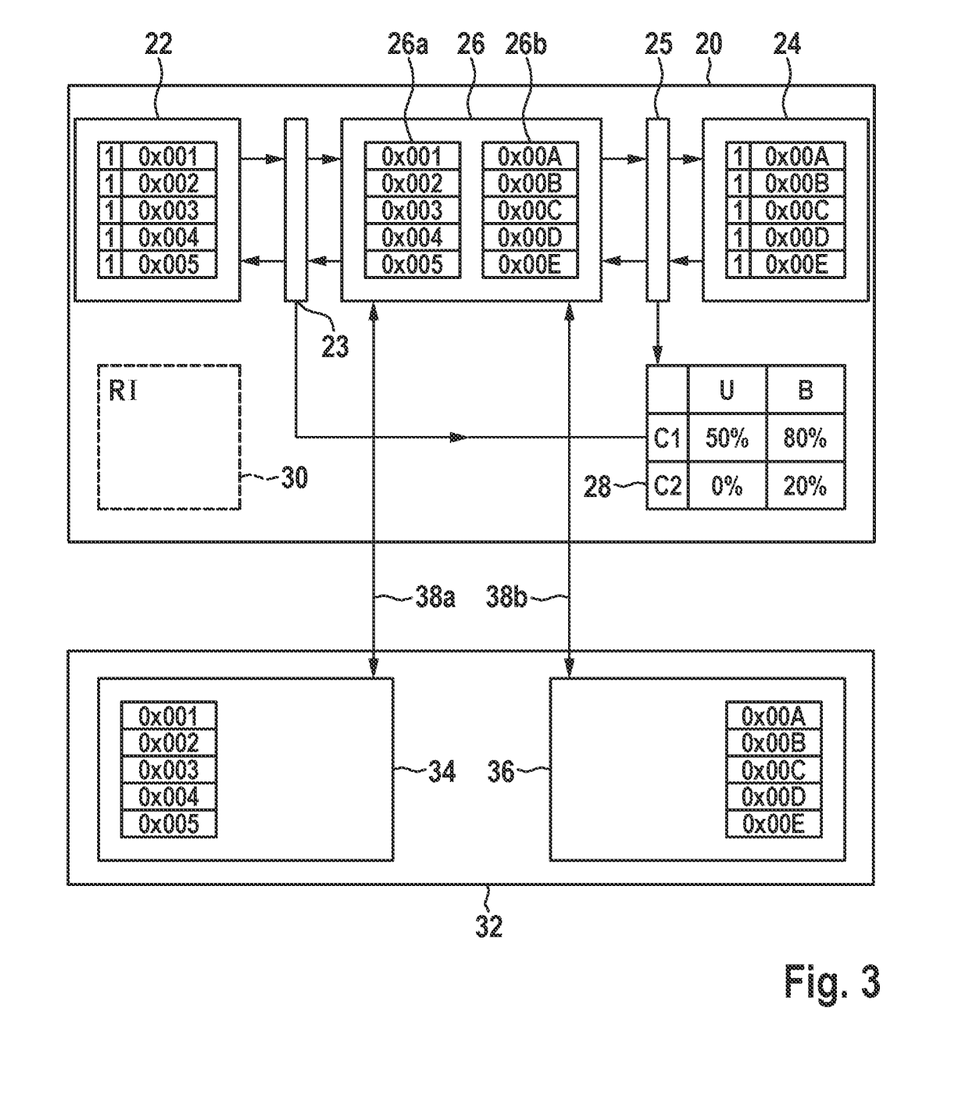
FIG. 3 schematically illustrates an example of a memory architecture of a system on chip, according to an example embodiment of the present invention.

According to the first aspect, there is provided a computer-implemented method 10 for managing cache utilization of at least a first processor 22, C1 when sharing a cache with a further processor 24, C2, comprising:

executing 12, during a first regulation interval 46, a first application A1 on a first processor 22, C1, wherein the first application causes at least one block 26b to be mapped from an external memory 32, MEM to a shared cache 26, L2 according to a cache utilization policy 28 associated with the first application A1;

monitoring 14 a utilization of the shared cache by the first processor during the first regulation interval;

comparing 16 the utilization of the shared cache by the first processor to a cache utilization condition associated with the first processor; and adjusting 18 the cache utilization policy 28, if the utilization of the shared cache by the first processor exceeds the cache utilization condition associated with the first processor.

For example, the computer-implemented method 10 is executed by the quality of service manager QOS residing in the operating system OS. In an embodiment, the quality of service manager QOS may be hosted by at least one hypervisor.

In an example, a first application A1 is hosted on a first processor C1, and a second application A2 is hosted on a second processor C2. The first application A1 has more stringent timing requirements compared to the second application A2. In an example, the first application A1 has a higher degree of safety criticality as compared to the second application A2. In an example, the first application A1 has a higher computational throughput requirement (for example, as measured in flops) as compared to the second application A2. In an example, the first application A1 has a higher bandwidth requirement when accessing the shared main memory MEM, as compared to the second application A2. In an example, a plurality of processors C1-C4 host applications grouped between the processors based on safety criticality of the applications, for example.

In this example, a group of timing critical applications are therefore deployed on one or more dedicated processors C1. Other non-time-critical applications may be deployed on one or more other processors C2-C4. All processors share the cache L2.

The quality of service monitor QOS determines when an entire system, or certain applications A1-A4 are undergoing degradation due to excessive shared cache L2 usage. The quality of service monitor QOS is configured, upon detection of system degradation caused by excessive shared cache L2 usage, to change the caching policy of memory pages associated with the applications A1-A4. For example, certain memory pages related to at least one of the applications A1-A4 are marked as uncacheable. For at least one of the processors, the technique provides an interface allowing a system designer to assign a shared cache L2 occupancy budget assigned between different processors C1-C4. In an example, the system designer may define a system-wide regulation interval, or design criteria for varying the system-wide regulation interval. The cache utilization policy may, in an example, define a maximum budget corresponding to the maximum number of shared last level cache blocks L2 used by each of the processors C1-C4 in a given regulation interval. The cache utilisation policy may be static and tied to the individual processors C1-C4. In an example, the cache utilisation policy may be varied based on changes in the profile (for example: latency requirements, safety criticality level, required bandwidth) of applications currently executing.

Figure 5:
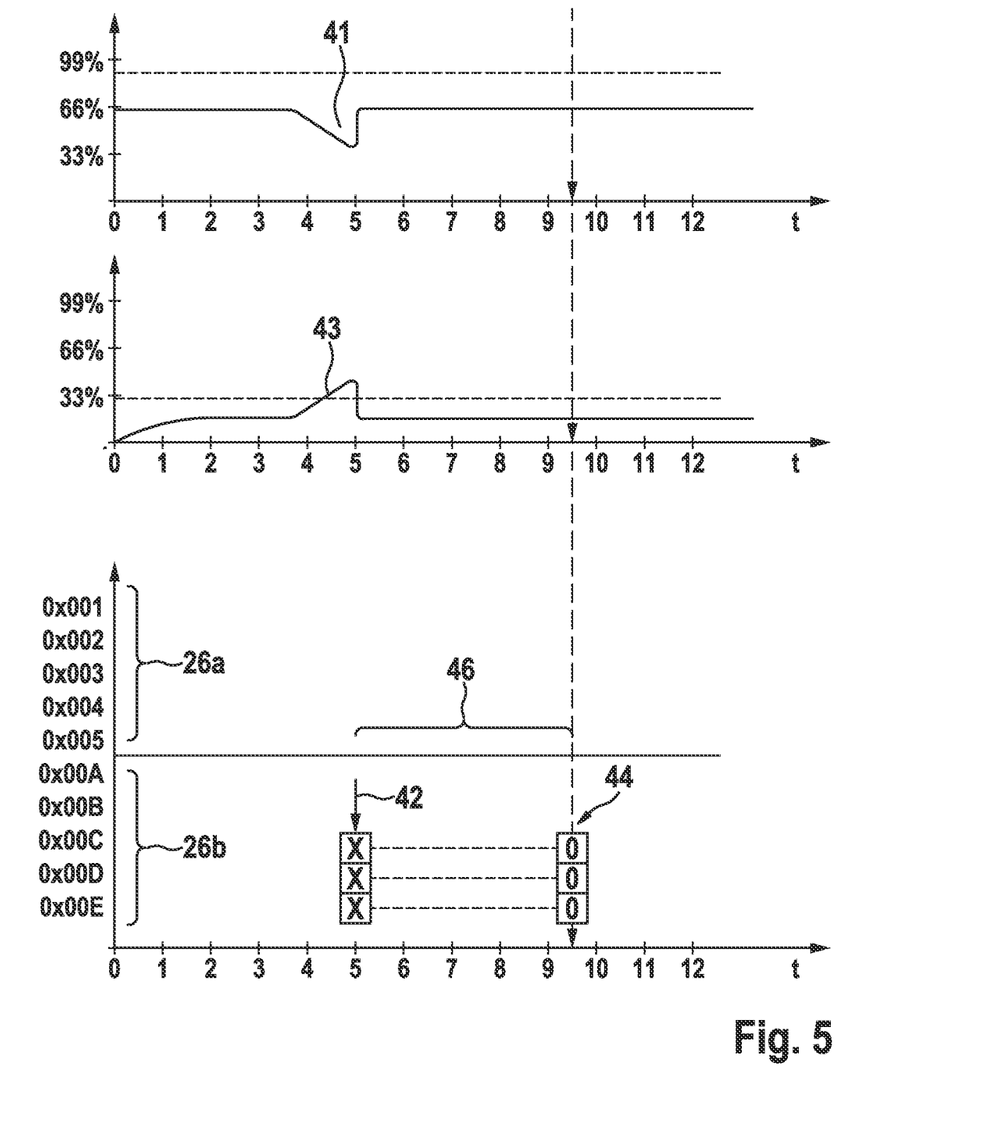
FIG. 5 schematically illustrates an example of a cache utilization policy being implemented over time, according to an example embodiment of the present invention.

Monitoring 14 the performance of the shared cache is performed, for example, by tracking the cumulative number of cache misses experienced by an application executed on a processor during a given time period, for example the regulation interval 46. Alternatively, the utilisation of the shared cache may be monitored according to the cumulative number of conflict misses associated with each of the processors (when data are required by the first processor was previously in the cache, but became evicted).

In each regulation interval, the quality of service monitor QOS may monitor the shared cache L2 occupancy caused by each processor. For example, the hardware performance monitoring unit of each processor can be used to trace cache misses, bus accesses, and the like. Cache occupancy, which is the number of unique cache blocks accessed by a processor, can be defined as a function of the number of cache accesses and cache hits.

Comparing 16 the utilization of the shared cache by the first processor to a cache utilization condition associated with the first processor comprises, in an example, comparing a number of cache misses experienced by the first processor to a threshold of cache misses.

Upon the number of cache misses experienced by the first processor C1 exceeding the threshold of cache misses, the cache utilisation policy 28 may be adjusted. The adjustment of the cache utilisation policy may be a sudden, or gradual process.

In one example, when the utilisation of the shared cache exceeds a pre-set threshold, for each of the following shared cache L2 accesses until the next regulation interval on the given processor C1, the QoS manager changes the cache utilisation policy of the memory pages of the executing application A2 (having, for example, a lower criticality than application A1), thus making them non-cacheable. In an example, memory requests for given memory pages of the executing application A2 arising from the processor are disabled. The QoS manager can, therefore, control the interference between processors in the shared cache L2. Each application A1-A4 continues to execute, but application A2 experiences degraded performance because all new requests from A2 are uncached and therefore must be fetched from the main memory MEM. The shared cache L2 is not disabled, but rather the QoS manager manipulates at least one cacheability bit of a memory page of the low criticality application, so that subsequent page accesses are false.

When the first regulation interval has elapsed, and a second regulation interval begins, the QoS manager resets, or adjusts, the cache utilisation policy of a given application. The transition from the first to the second regulation interval causes all cacheability bits to be reset such that all pages of the low criticality application A2 are cacheable again.

Accordingly, by choosing an appropriate cache utilisation policy 28 (comparable to a cache occupancy budget), and an appropriate regulation interval, the amount of interference caused by each processor in the shared cache is controlled. This leads to higher criticality applications being able to provide a higher quality of service (such as, being able to complete their compute tasks with a lower latency, or to process a higher bandwidth of data).

In a scenario where application A1 is a high criticality application, and application A2 is a low criticality application, it may be desired to run application A1 in an unconstrained manner. Therefore, an approach is to leave the processor C1, upon which the high criticality application executes, as being unregulated, or as having a high threshold in the cache utilization policy 28, with significant limits being set on the cache utilisation policies 28 relevant to the processors C2, C3, C4 executing programs with low timing criticality.

In another scenario, the cacheability enforcement can be triggered by monitoring the performance of the processor C1 executing the application A1 having a high time criticality. If the QoS manager observes that the execution time of the high criticality application A1 is affected negatively by cache accesses of processors C2, C3, C4 executing low criticality applications A2, A3, A4, then the cache utilisation policy 28 is adjusted to begin disabling the cacheability of memory pages associated with the low criticality applications A2, A3, A4.

Figure 4:
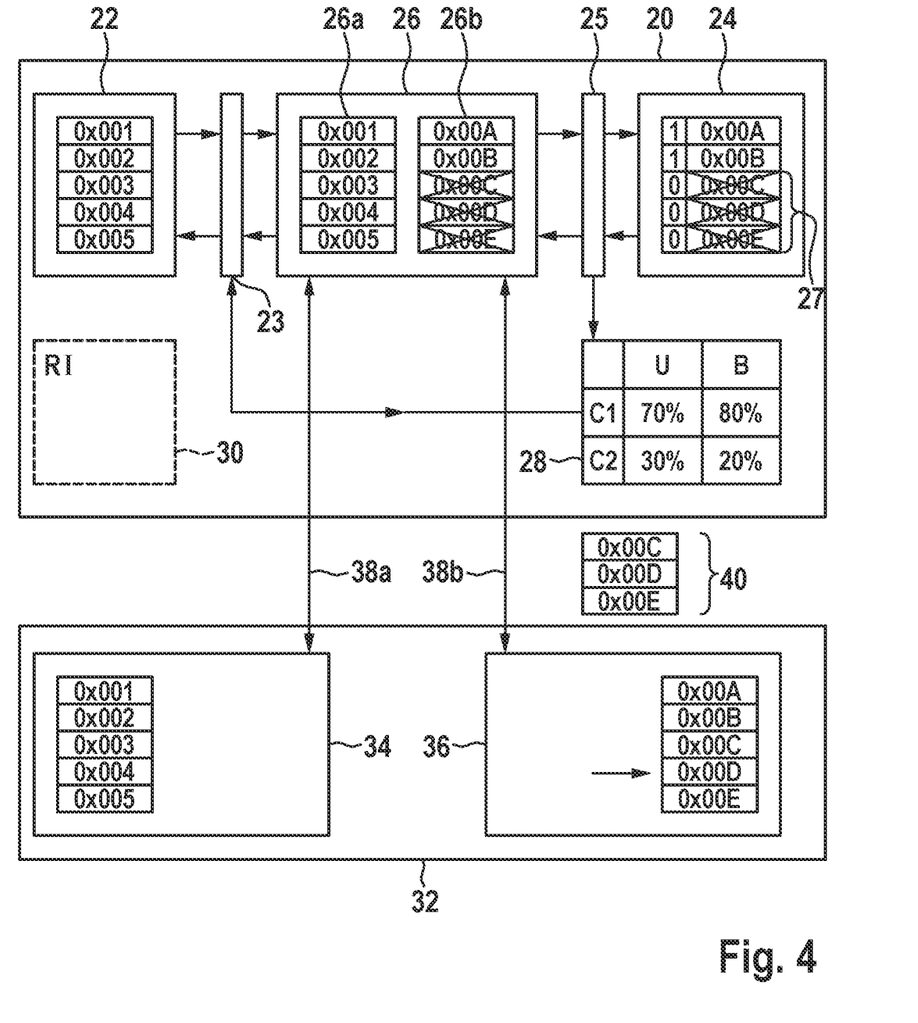
FIG. 4 schematically illustrates one example of the implementation of a cache utilization policy, according to an example embodiment of the present invention.

According to an embodiment, changing the cache utilization policy 28 associated with the first application A1 comprises denoting at least one page 27 associated with the first application to be non-cacheable.

For example, for each application, the operating system or hypervisor maintains an entry in the page table defining a frame number (address), an entry defining whether or not the frame number is present in the cache, an entry defining whether or not the frame is protected from being overwritten, a reference entry, a cacheability entry defining whether, or not, a frame may be cached in the shared cache, and an entry defining whether, or not the frame is dirty, and requires refreshing from main memory.

The aforementioned cacheability entry defines, for each memory page of an application A1, as identified by the frame address, whether or not the page will be cached in the shared cache L2, or will be bypassed. In an example, the cacheability entry is a bit that is initially set as 1 for all pages. As the embedded system experiences challenges meeting the cache utilisation policy, increasing numbers of pages (frames) are denoted as non-recoverable. For example, when considering an embedded control system of a vehicle, driving conditions or speed of the vehicle may impose higher compute intensive requirements on applications associated with assisted driving (with such applications having a high level of safety criticality). In order to service the applications having a high level of safety criticality, applications associated with the vehicle infotainment system may have an increasing number of their pages denoted as non-cacheable.

According to an embodiment, the at least one page associated with the first application (that has previously been denoted as non-cacheable) is denoted to be cacheable upon the transition from the first regulation interval 46 to a subsequent regulation interval.

For example, the quality of service monitor QOS may recognise that a safety critical application A1 is, during a given regulation interval, under using the shared cache L2. The quality of service monitor QOS may additionally recognise that applications having a lower safety criticality level are being starved of access to the shared cache L2. In this case, pages associated with applications having a lower safety criticality level compared to the safety critical application A1 may be redesignated from being non-cacheable to being cacheable. Such an example may be applied, for example, in a vehicular embedded processing system when a vehicle stops driving. In this case, the safety critical driving applications A1 may be de-rated in terms of cache usage in order to enable more use of the shared cache by infotainment applications, for example.

According to an embodiment, the method further comprises:

executing, during the first regulation interval 46, a second application A2 on a second processor 24, C2, wherein the second application causes at least one further block to be mapped from an external memory 32, MEM to the shared cache 26, L2 according to a cache utilization policy associated with the second application;

monitoring the utilization of the shared cache 26, L2 by the second processor 24, C2 during the first regulation interval;

comparing the utilization of the shared cache by the second processor 24, C2 to a second cache utilization condition associated with the first processor; and adjusting the cache utilization policy 28 associated with the second application, if the utilization of the shared cache by the second processor 24, C2 exceeds the cache utilization condition associated with the second processor 24, C2.

FIG. 3 schematically illustrates an example of a memory architecture of a system on chip.

FIG. 3 is based on the architecture of the SOC illustrated in FIG. 2. The SOC 20 comprises a first processor 22 and a second processor 24. At least the first processor 22 and the second processor 24 have access to the shared cache 26. The main memory 32 durably stores a first set of memory pages 34 associated with a first application A1, and a second set of memory pages 36 associated with a second application A2. For the purposes of this example, the first application A1 is considered to have higher safety criticality and latency requirements as compared to the second application A2. One or more memory buses 38a, 38b communicably couple the main memory 32 to at least the shared cache 26.

The SOC 20 further comprises a regulation interval unit 30. In one example, the regulation interval unit 30 generates a regular regulation interval proportional to the system clock, for example. In another example, the regulation interval unit 30 generates regulation interval signals based on events monitored in the SOC 20, or a host system of the SOC 20. All cacheability bits associated with all pages 0x001, 0x002 . . . of applications hosted by the first processor 22, and all pages 0x00A, 0x00B of applications by the second processor 24 are set to "1"-in other words all pages of both applications can use the shared cache.

The SOC 20 further comprises a cache utilisation policy module 28. The illustrated example shows that in a first mode U, the processor C1 may rely on a shared cache utilisation budget of 50%, but in a second mode B, the processor C1 shared cache utilisation budget rises to 80%. For example, when the first mode U, the processor C1 may occupy up to 50% of the available cache blocks in the shared cache 26, transition into the second mode B, the processor C1 up to 80% of the available cache blocks in the shared cache 26. To the extent that the processor C1 attempts to cache data to a cache block of the shared cache 26 occupied by application (of lower safety criticality) executing on the second processor 26, the processor C1 evicts the cache block of the C2 and denotes the associated page of the application executing on the second processor as non-cacheable.

The SOC 20 further comprises at least a first processor cache monitor 23 and a second processor cache monitor 25. In examples, a processor cache monitor may be provided for each processor available in the SOC 20. The processor cache monitors 23 and 25 observe interactions of the respective processors with the shared cache and attempts to identify metrics useful for deciding when to enforce the cache utilisation policy. For example, either or both of the processor cache monitors may monitor for cache misses arising from a processor, monitor the response time of the cache, or monitor the number of cache blocks occupied by applications executing on the processors. Therefore, the cache monitors enable the monitoring of a cache occupancy level corresponding to a current number of shared last level cache-lines used by each of the processors during a given regulation interval.

FIG. 4 schematically illustrates one example of the implementation of a cache utilization policy.

FIG. 4 illustrates the SOC 20 of FIG. 3 at a subsequent point in time. The cache utilisation policy 28 in the first mode U has been updated such that the first processor 22 may utilize 70% of the shared cache 26, as compared to 50% of the shared cache. As the working set of the application hosted by the first processor 22 expands in the shared cache, cache blocks associated with the application hosted by the second processor 24 are gradually evicted. The change in cache utilisation policy 28 is implemented by setting one or more of the cacheability bits in a subset 27 of pages associated with the second application hosted by the second processor 24 to logic "0", thus denoting that the associated pages 0x00C, 0x00D, 0x00E may not be stored in the shared cache 26. Accordingly, whenever the second application hosted by the second processor 24 requires pages 0x00C, 0x00D, 0x00E, they must be fetched from the main memory 32. In this way, the cache utilization policy 28 is observed. The distribution of the cacheability bits may be re-evaluated as the regulation interval elapses.

According to an embodiment, the cache utilization condition associated with the second processor 24, C2 allows the second processor to utilize less of the shared cache 26 during the first regulation interval 46 as compared to the first processor 22, C1, wherein the first application A1 has a more stringent latency requirement, and/or a more stringent safety criticality ranking compared to the second application A2.

According to an embodiment, the method 10 further comprises setting the cache utilization condition associated with the first processor 22, C1 to enable the first processor to obtain unconstrained access to the shared cache 26. In practice, this may involve setting all cacheability bits of pages of an application hosted by the second processor to denote that those pages may not be cached, thus enabling the shared cache to be dominated by pages associated with the application hosted by the first processor.

According to an embodiment, the method 10 further comprises monitoring the performance of the first application A1 executing on the first processor 22, C1 and, upon identifying that the performance of the first application is degrading, adjusting the cache utilization condition associated with the second processor 24, C2 to reduce the amount of shared cache 26b occupied by the second processor.

Performance degradation may be identified by monitoring, for example, the response time of safety critical applications, monitoring system-wide main memory utilization, or monitoring a number or rate of cache misses associated with each applications and/or processor.

According to an embodiment, the cache utilization policy 28 associated with the first application A1 defines a first and a second subset of pages associated with the first application, wherein the first subset of pages are accessed relatively more frequently than the second subset of pages. Changing the cache utilization policy 28 associated with the first application comprises denoting at least one page in the second subset of pages associated with the first application to be non-cacheable.

For example, the QoS manager obtains additional information concerning which pages of an application are accessed less frequently. In an example, the additional information can be obtained by profiling the application offline on a specimen dataset. In an example, cache pollution may be reduced by not storing memory pages in the shared cache L2 that are only used, for example, once or a predetermined number of times, or at a predetermined rate relative to the regulation interval. With this information, the QoS manager selectively disables a subset of pages that reduces cache pollution, and therefore improves performance.

According to an embodiment, the method 10 further comprises identifying, using a system monitor 30, an event, and transitioning from the first monitoring interval to a further monitoring interval when the event is identified. For example, the regulation interval may be fixed and periodic. In another example, the regulation interval may be triggered by the onset of events such as a visible performance degradation in an application, an increase in the latency of processing instructions from an application, a change in operating mode of the host system, and many others. The QOS monitor may switch between a first mode in which the regulation interval is periodic with a regular period, and a second mode in which the regulation interval is event driven.

For example, the QOS monitor may be comprised in a vehicular embedded computing system. The QOS monitor may obtain an indication from at least one electronic control unit of the vehicle that the vehicle is transitioning from a parked state to a driving state. Accordingly, the QOS monitor may trigger an event that changes the regulation interval. In response to the changing state of the vehicle, the QOS monitor may improve the cacheability of pages related to assisted driving applications.

According to an embodiment, the method 10 further comprises monitoring at least one additional metric comprised in the group of: (i) cache misses of at least the first processor when accessing the shared cache, (ii) a response time of at least the first application, (iii) a system-wide main memory utilization and adjusting the cache utilization policy 28 associated with the first application A1 based on the additional metric.

The technique therefore uses the cache utilisation policy (in other words, a cache occupancy budget) to decide whether, or not, to disable the caching of one or more pages of an application A1.

According to an embodiment, the method 10 is operated by a hypervisor or an operating system of a data processing system. According to an embodiment, the first processor is a processor core, an embedded microprocessor, or a graphics processing unit.

FIG. 5 schematically illustrates an example of a cache utilization policy being implemented over time.

The upper graph schematically illustrates an example of the monitored utilisation of the first processor C1 against time. The middle graph schematically illustrates an example of the monitored utilisation second processor C2 against time. Initially, all memory pages may be cached in the shared cache. The lower graph schematically illustrates changes to the cacheability bit of pages associated with a first 26a and second 26b portion of a shared cache. For example, the shared cache utilisation attributable to the application hosted by the first processor C1 may experience a decline in performance at time step 41 at the same time that a shared cache utilisation attributable to the application hosted by the second processor C2 increases 43 above a level set in the cache utilisation budget. This triggers a modification of the cacheability bits associated with memory pages 0x00A, 0x00B, 0x00C to denote that these pages are not cacheable in the shared cache. The cacheability bits associated with memory pages 0x00A, 0x00B, 0x00C remain in this topic for the period 46 until the next change of regulation interval at 44, whereupon the cacheability bits associated with memory pages 0x00A, 0x00B, 0x00C are modified to denote that the memory pages associated with memory pages 0x00A, 0x00B, 0x00C may again be cached in the shared cache. As shown in the middle graph, the effect is an immediate reduction in the utilisation of the shared cache by the second processor, thus preserving the safety criticality of the application hosted by the first processor C1.

According to a second aspect, there is provided a data processing system 20, SOC, comprising at least one processor 22, C1, a shared cache 26, L2 communicably coupled to the at least one processor and a further processor 24, C2, an external memory 32, MEM communicably coupled to the shared cache, a control entity QOS.

The control entity QOS is configured to schedule execution, during a first regulation interval 46, of a first application A1 on the at least one processor 22, C1, wherein the first application causes at least one block to be mapped from an external memory 32, MEM to a shared cache according to a cache utilization policy associated with the first application, to monitor a utilization of the shared cache 26, L2 by the at least one processor during the first regulation interval 46, to compare the utilization of the shared cache 26, L2 by at least one processor 22, C1 to a cache utilization condition associated with the at least one processor, and to adjust the cache utilization policy associated with the first application A1, if the utilization of the shared cache 26 by the at least one processor 22, C1 exceeds the cache utilization condition associated with the at least one processor 22, C1.

According to a third aspect, there is provided a computer program element comprising machine-readable instructions which, when executed by a processor, cause the processor to perform the steps of the first aspect, or its embodiments.

According to a fourth aspect, there is provided a computer readable medium comprising the computer program element of the third aspect.

The computer readable medium is configured to store a computer program, application, logic including machine code capable of being executed by a processor. The computer readable medium includes RAM, ROM, EEPROM, and other devices that store information that may be used by the processor. In examples, the processor and the computer readable medium are integrated on the same silicon die, or in the same packaging. In examples, the computer readable medium is a hard disc drive, solid state storage device, or the like. In an example, the signal may be communicated over a data communication network such as the Internet as a download, or software update, for example.

The examples provided in the drawings and described in the foregoing written description are intended for providing an understanding of the principles of this specification. No limitation to the scope of the present invention is intended thereby. The present specification describes alterations and modifications to the illustrated examples. Only the preferred examples have been presented, and all changes, modifications and further applications to these within the scope of the specification are desired to be protected.

What is claimed is:

1. A computer-implemented method for managing cache utilization of at least a first processor when sharing a cache with a further processor, comprising the following steps:
executing, during a first regulation interval, a first application on a first processor, wherein the first application causes at least one block to be mapped from an external memory to a shared cache according to a cache utilization policy associated with the first application;
monitoring a utilization of the shared cache by the first processor during the first regulation interval;
comparing the utilization of the shared cache by the first processor to a cache utilization condition associated with the first processor; and
adjusting the cache utilization policy associated with the first application, when the utilization of the shared cache by the first processor exceeds the cache utilization condition associated with the first processor;
wherein the adjusting of the cache utilization policy associated with the first application includes:
denoting at least one page associated with the first application to be non-cacheable by setting at least one cacheability bit of the at least one page to a setting indicating the at least one page is non-cacheable, and
upon transition from the first regulation to a subsequent regulation interval, denoting the at least one page associated with the first application to be cacheable by setting at least one cacheability bit of the at least one page to a setting indicating that at least one page is cacheable.

2. The computer-implemented method according to claim 1, further comprising:
executing, during the first regulation interval, a second application on a second processor, wherein the second application causes at least one further block to be mapped from an external memory to the shared cache according to a cache utilization policy associated with the second application;
monitoring the utilization of the shared cache by the second processor during the first regulation interval;
comparing the utilization of the shared cache by the second processor to a second cache utilization condition associated with the second processor; and
adjusting the cache utilization policy associated with the second application, when the utilization of the shared cache by the second processor exceeds the second cache utilization condition associated with the second processor.

3. The computer-implemented method according to claim 2, wherein the second cache utilization condition associated with the second processor allows the second processor to utilize less of the shared cache during the first regulation interval as compared to the first processor, and wherein the first application has a more stringent latency requirement, and/or a more stringent safety criticality ranking compared to the second application.

4. The computer-implemented method according to claim 3, further comprising:
setting the cache utilization condition associated with the first processor to enable the first processor to obtain unconstrained access to the shared cache by setting all cacheability bits of pages of the second application executed by the second processor to denote that the pages of the second application may not be cached.

5. The computer-implemented method according to claim 4, wherein each of pages of the second application is associated with at least one respective cacheability bit which indicates whether or not the page of the second application is cacheable.

6. The computer-implemented method according to claim 5, wherein the cacheability bits of the pages of the second application are stored in entries, corresponding to the pages of the second application, of a page table.

7. The computer-implemented method according to claim 3, further comprising:
monitoring performance of the first application executing on the first processor;

upon identifying that the performance of the first application is degrading, adjusting the second cache utilization condition associated with the second processor to reduce an amount of shared cache occupied by the second processor.

8. The computer-implemented method according to claim 1, further comprising:
identifying, using a system monitor, an event; and
transitioning from the first regulation interval to a further regulation interval when the event is identified.

9. The computer-implemented method according to claim 1, further comprising:
monitoring at least one additional metric included in the group of: (i) cache misses of at least the first processor when accessing the shared cache, (ii) a response time of at least the first application, (iii) a system-wide main memory utilization; and
adjusting the cache utilization policy associated with the first application based on the additional metric.

10. The computer-implemented method according to claim 1, wherein the method is operated by a hypervisor or an operating system of a data processing system.

11. The computer-implemented method according to claim 1,
wherein the first processor is a processor core or an embedded microprocessor or a graphics processing unit.

12. The computer-implemented method according to claim 1, wherein each of pages of the first application is associated with at least one respective cacheability bit which indicates whether or not the page the page is cacheable.

13. The computer-implemented method according to claim 12, wherein the cacheability bits of the pages of the first application are stored in entries, corresponding to the pages, of a page table.

14. A computer-implemented method for managing cache utilization of at least a first processor when sharing a cache with a further processor, the method comprising the following steps:
executing, during a first regulation interval, a first application on a first processor, wherein the first application causes at least one block to be mapped from an external memory to a shared cache according to a cache utilization policy associated with the first application;
monitoring a utilization of the shared cache by the first processor during the first regulation interval;
comparing the utilization of the shared cache by the first processor to a cache utilization condition associated with the first processor; and
adjusting the cache utilization policy associated with the first application, when the utilization of the shared cache by the first processor exceeds the cache utilization condition associated with the first processor;
wherein the cache utilization policy associated with the first application defines a first and a second subset of pages associated with the first application, wherein the first subset of pages are accessed relatively more frequently than the second subset of pages; and wherein adapting the cache utilization policy associated with the first application includes:
denoting at least one page in the second subset of pages associated with the first application to be non-cacheable by setting at least one cacheability bit of the at least one page in the second subset of pages to a setting indicating the at least one page is non-cacheable.

15. A data processing system, comprising:
at least one processor;
a shared cache communicably coupled to the at least one processor and a further processor;
an external memory communicably coupled to the shared cache; and
a control entity, wherein the control entity is configured to:
schedule execution, during a first regulation interval, of a first application on the at least one processor, wherein the first application causes at least one block to be mapped from an external memory to a shared cache according to a cache utilization policy associated with the first application,
monitor a utilization of the shared cache by the at least one processor during the first regulation interval,
compare the utilization of the shared cache by at least one processor to a cache utilization condition associated with the at least one processor, and
adjust the cache utilization policy associated with the first application, when the utilization of the shared cache by the at least one processor exceeds the cache utilization condition associated with the at least one processor;
wherein the adjusting of the cache utilization policy associated with the first application includes:
denoting at least one page associated with the first application to be non-cacheable by setting at least one cacheability bit of the at least one page to a setting indicating the at least one page is non-cacheable, and
upon transition from the first regulation to a subsequent regulation interval, denoting the at least one page associated with the first application to be cacheable by setting at least one cacheability bit of the at least one page to a setting indicating that at least one page is cacheable.

16. A non-transitory computer readable medium on which is stored a computer program for managing cache utilization of at least a first processor when sharing a cache with a further processor, the computer program, when executed by a processor, causing the processor to perform the following steps:
executing, during a first regulation interval, a first application on a first processor, wherein the first application causes at least one block to be mapped from an external memory to a shared cache according to a cache utilization policy associated with the first application;
monitoring a utilization of the shared cache by the first processor during the first regulation interval;
comparing the utilization of the shared cache by the first processor to a cache utilization condition associated with the first processor; and
adjusting the cache utilization policy associated with the first application, when the utilization of the shared cache by the first processor exceeds the cache utilization condition associated with the first processor;
wherein the adjusting of the cache utilization policy associated with the first application includes:
denoting at least one page associated with the first application to be non-cacheable by setting at least one cacheability bit of the at least one page to a setting indicating the at least one page is non-cacheable, and
upon transition from the first regulation to a subsequent regulation interval, denoting the at least one page associated with the first application to be cacheable by setting at least one cacheability bit of the at least one page to a setting indicating that at least one page is cacheable.

\* \* \* \* \*